United States Patent

Winsel

[15] 3,660,166
[45] May 2, 1972

[54] GAS DIFFUSION ELECTRODE

[72] Inventor: August Winsel, Kelkheim, Germany

[73] Assignees: Siemens Aktiengesellschaft, Berlin, Germany; Varta Aktiengesellschaft, Frankfurt/Main, Germany

[22] Filed: Mar. 14, 1967

[21] Appl. No.: 623,109

[30] Foreign Application Priority Data

Mar. 17, 1966 Germany ................S 102563

[52] U.S. Cl. ................136/86 D, 136/120 FC
[51] Int. Cl. ................H01m 27/04, H01m 13/00
[58] Field of Search ................136/86, 120 FC

[56] References Cited

UNITED STATES PATENTS

| 3,404,038 | 10/1968 | Winsel | 136/120 |
| 3,457,115 | 7/1969 | Kent | 136/86 |
| 3,207,682 | 9/1965 | Oswin et al. | 136/120 |
| 3,215,563 | 11/1965 | Clemm | 136/120 X |
| 3,253,958 | 5/1966 | Shinn | 136/86 |
| 3,403,057 | 9/1968 | Stankavich et al. | 136/86 X |
| 3,445,294 | 5/1969 | Leonard | 136/86 |

FOREIGN PATENTS OR APPLICATIONS

| 1,012,362 | 12/1965 | Great Britain | 136/120 |
| 678,977 | 1/1964 | Canada | 136/86 |
| 1,379,800 | 10/1964 | France | 136/86 |
| 995,577 | 6/1965 | Great Britain | 136/86 |

Primary Examiner—Winston A. Douglas
Assistant Examiner—M. J. Andrews
Attorney—Erich M. Radde, Charles A. McClure, Gerard J. Weiser and Alfred Stapler

[57] ABSTRACT

Catalytic electrode having improved heat dissipating means. The electrode embodies a foraminous metallic web having deposited over major portions of its surfaces porous catalytic material framed within gasket material and essentially having sufficient web surface exposed to effectively remove heat from the electrode during its operation in a fuel cell or other exothermic catalytic processes.

12 Claims, 7 Drawing Figures

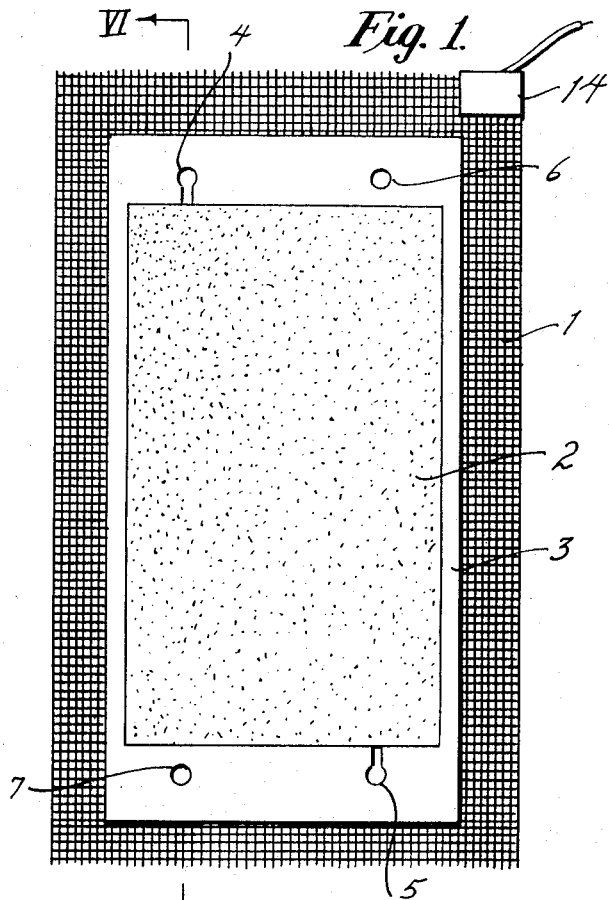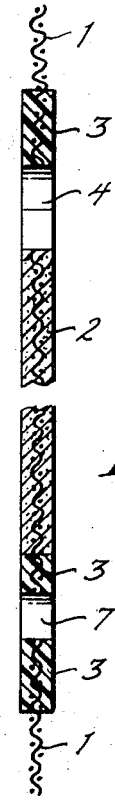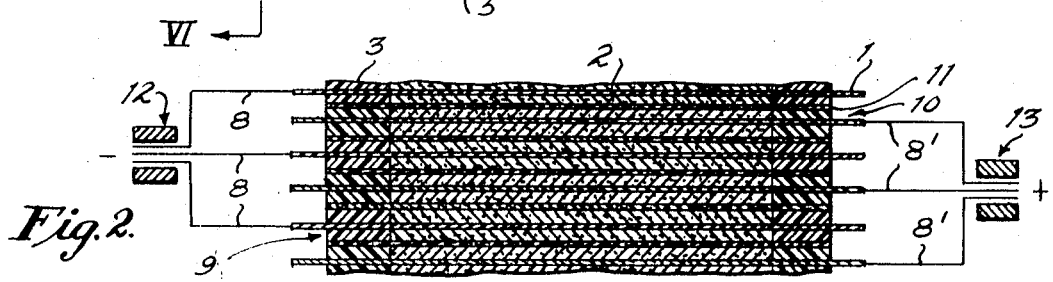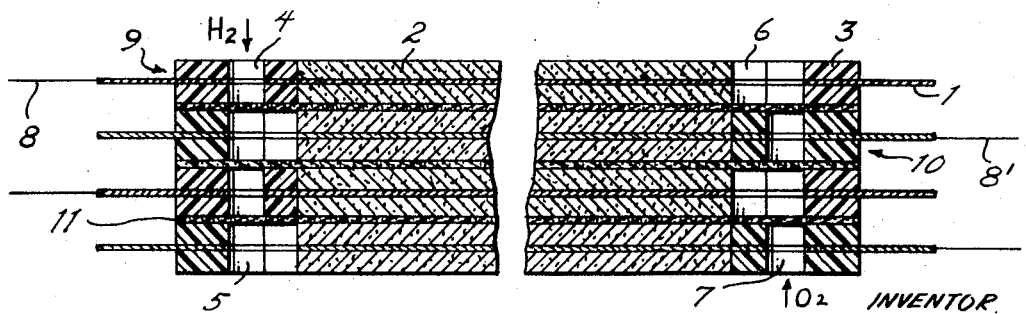
INVENTOR
AUGUST WINSEL
BY Gerard J. Weiser
ATTORNEY.

INVENTOR
AUGUST WINSEL
BY
ATTORNEY.

3,660,166

GAS DIFFUSION ELECTRODE

SUMMARY OF THE INVENTION

The invention relates to a novel gas-diffusion electrode which comprises a metallic porous and/or perforated foil-like or sheet-like carrier means, hereinafter referred to as a foraminous web, which contains on at least one of its plane surfaces a layer of a catalytic, preferably an electrochemically active, material, which layer of material is framed by at least one border of an electrically non-conductive, resilient, gasket material. The catalytic material preferably forms thin layers on both faces of the foraminous web. The layers preferably are located opposite to each other and are of substantially identical area. Each layer is framed, or surrounded by, at least one outer border of gasket material and the catalytic material advantageously fills at least in part the pores or interstices of the web.

Each frame-like border of the gasket material advantageously is of the same thickness as the layer of enclosed catalytic material. The frame-like borders located on opposite faces of the carrier are adhered, fused, or otherwise joined to each other to form a gas-tight joint, with the corresponding part of the web imbedded therein. A leakproof seal thus is established at the outer edge of the electrochemically active material. The layers of the catalytic material preferably will cover the entire surface area enclosed by the frame-like border. However, it has also been found advantageous to design the electrode with portions of the web within the confines of the outer border exposed for added cooling by means of a coolant which can be circulated through the exposed portions. These inner exposed portions are framed by borders similar to the outer border to seal the catalytic material from the coolant.

Preferred is an embodiment of the electrode in which at least a part of the foraminous web is unoccupied either by the layer of catalytic material or by the surrounding gasket material border and wherein part of said unoccupied part of the foraminous web extends outwardly beyond the outer border layer of gasket material on at least part of the perimeter of the electrode, framing the electrode body in exposed metallic frame. The exposed parts of the foraminous web serve as a cooling fins for the removal of the heat energy from the body of the electrode. Advantageously, sections of the foraminous web border may have the shape of individual tabs which can serve as cooling fins. Also, tabs can serve as the contact means for the electrical connections of the electrodes.

DESCRIPTION OF SEVERAL VIEWS OF DRAWING

With reference to the attached drawing,

FIG. 1 is a front elevation of a schematic representation of a rectangular embodiment of the electrode of the invention, in which an exposed border of foraminous web extends all around the electrode.

FIG. 2 is a fragmentary vertical section, in schematic representation, of a multiplicity of electrodes of the invention, anodes and cathodes each similar to that of FIG. 1, in assembled form with diaphragms interspersed.

FIG. 6 is a fragmented enlarged side elevation of the electrode shown in FIG. 1, viewed along the line 6—6 of FIG. 1.

FIG. 7 is a fragmented cross-sectional view of an anode and a cathode in stocked array showing alignment of the holes for hydrogen and oxygen.

DETAILED DESCRIPTION OF THE INVENTION

Figure 3:
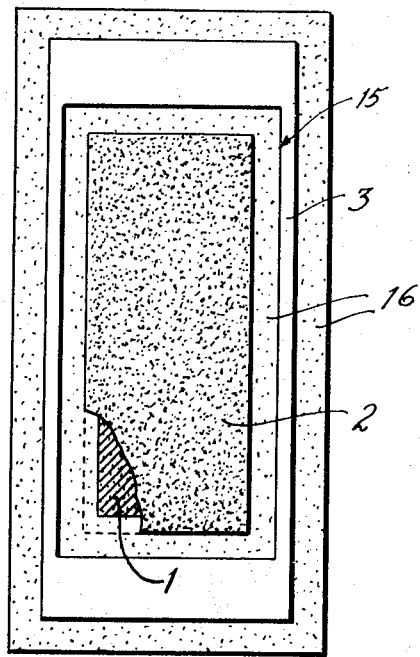
FIG. 3 is a front elevation of another embodiment of a rectangular embodiment of the electrode of the present invention, in schematic representation, in which the foraminous web forms two heat dissipating borders and in which the central enclosed portion of the electrode contains the catalytic material alone. A frame of gasket material separates the two exposed borders.

The invention relates to electrodes particularly useful in electrochemical devices and apparatus as well as in other catalytic applications. More particularly, it concerns gas-diffusion electrodes which are useful in electrochemical devices and apparatus, e.g. fuel cells, wherein thin, finely porous diaphragms are utilized between anodes and cathodes. Gas-diffusion electrodes are disclosed in German Patent DBP 1,164,525 wherein it has been proposed to eliminate the concentration polarization in fuel cell batteries or in electrolytic apparatus by forcing fresh electrolyte through the pores of the electrodes under the effect of the pressure differential between the gas side and the electrolyte side of the electrodes. The dilute electrolyte which is displaced in this manner is reconcentrated and recycled through the cells of the battery or electrolyte apparatus.

Generally, the quantities of electrolyte cycled for the purpose of eliminating the concentration polarization are too small for removing from the fuel cell battery all the heat energy generated in the course of the electrochemical processes. This is especially true if the electrodes of the battery are separated from each other merely by thin, finely porous diaphragms. With this kind of arrangement, relatively high quantities of heat energy are generated and released in a small space. On the other hand, the pressure differential effecting the flow of the electrolyte through the pores of the electrodes and diaphragms cannot be increased sufficiently to cause the flow of enough electrolyte through the pores of the electrode to completely remove, or dissipate this generated undesired heat energy.

It is well known that heat energy is readily transported in metallic electrodes, due to their good heat conductivity, to the edge zones of the electrodes, from where the heat energy can be removed if the edge is also metallic. However, the use of a compact metal frame around the electrodes increases the weight of the electrodes considerably and also makes the manufacture of the electrodes more difficult and expensive.

It is therefore an object of the invention to provide a novel electrode which can be easily manufactured in readily available equipment and which is light in weight.

It is another object of the invention to provide an electrode which has a high tensile strength in the direction of its plane.

Another object of the invention is the provision of a novel electrode which is capable of dissipating the heat energy generated in the neighborhood of the electrode.

Other objects will become apparent from the attached drawings and from the detailed description of the invention.

The novel electrode of the invention in its various forms may be used with particular advantage in fuel cell batteries and in electrolytic apparatus. The invention provides many modifications and features which permit the adaptation of the electrode to any particular needs and requirements in these applications as will be set out hereinafter in detail. The various modifications and features may be recombined to form new forms of the electrode for other specific applications in fuel cell batteries or other electrochemical apparatus. The principles of the invention may be employed in the design and constructions of anodes and cathodes alike.

The construction of the electrode is based on a metallic foraminous web. The term foraminous web is intended to include a sheet, plate, or foil, in porous, perforated, slit, or woven form and to include specifically a screen, a sieve, a porous sintered sheet, a net and the like. One function of the forminous web is to serve as a carrier for catalytic material. The foraminous web also may serve as the gas conducting layer in the gas-diffusion electrodes of the invention. The electrodes of the present invention are characterized by a layer of the catalytic material preferably only in central area of the foraminous web. The layer of catalytic material is surrounded by a border of gasket material which is superimposed on the edge portion of the foil-like or sheet-like carrier web, so that the web extends outwardly at least to the outer edge of said border and preferably in at least one area beyond said outer edge of the border.

The foraminous web may have any desired shape and is generally made from a metal. It may be a wire net, a sieve or other perforated structure of a porous thin plate produced by the sintering of metal particles or the like.

The electrochemically active materials useful in the present invention are those catalytic materials generally used in the construction of electrodes for the stated purposes.

The border of a gasket material is preferably made from a lightweight material, which advantageously is an electrical insulator, though it is also possible to use other materials for this purpose, particularly, if the electrodes are to be used with insulating diaphragms, spaced between neighboring electrodes. Plastics, such as polyethylene, polypropylene, polytetrofluoroethylene and copolymers containing these are generally preferred for this purpose. They are lightweight, and resistant to corrosion by the materials used in the operation of the fuel cell batteries. They also excel in their ease of processing in the manufacture of the novel electrodes of the invention and they are practically impermeable to gases and liquids.

The gas-diffusion electrode constructed in accordance with the principles of the present invention has, among others, the following advantages:

1. It can be made very thin and thus is very light in weight.
2. It possesses a great tensile strength, resisting high tensional forces acting in the direction of the plane of the electrode.
3. The edges of the electrode are impermeable to gas and electrolyte.
4. The edges of the electrode are electrically conducting in the direction of the plane of the electrode, and electrically insulating in a direction perpendicularly thereto.
5. The parts of the foraminous web which protrude from the surrounding border of gasket material are used as heat exchange surfaces for the direct cooling of the electrode body.

In the embodiment of the electrode of the present invention illustrated in FIG. 1, the foraminous web 1, in the form of a rectangular nickel wire net, is covered in a central rectangular area on both sides of the web with an electrochemically active electrode material 2. The openings in the wire net in the covered portion are filled with the electrochemically active material, and the material and nickel wire are in electrically conductive contact. The central, rectangular layer of electrochemically active material 2 is surrounded by a frame-like border 3 of polyethylene plastic which is superimposed on both sides of the wire net in the areas directly surrounding the central layer 2 and which serves as a gasket material as well as a border material to retain the material 2. The plastic forming the border 3 likewise fills out the interstices in those parts of the wire net which are covered by it.

Inner surface portions of the superimposed gasket borders are tightly joined together, with the foraminous web imbedded therein, so that the edges of the electrode are liquid and gastight when the electrode is stacked with similar electrodes in cells and batteries. The border 3 has the same thickness as the enclosed layers of electrochemically active catalytic material 2. A border of exposed wire net 1 protrudes all around the electrode to provide a substantial heat exchange surface area.

In FIG. 1 bore holes 4 and 5 are provided at opposite ends of border 3. The holes are communicatively connected by their slot-like extensions or channels to the central layer of porous electrochemically active catalytic material 2. These bore holes 4 and 5 serve as the inlet and outlet means for the feed of fuel or other operating materials to the material 2. Further, in FIG. 1 cylindrical bore holes 6 and 7 are provided for the passage through the border 3 of the fuel to be used in a counter-electrode of opposite polarity. As will be readily apparent, if a multiplicity of anodes and cathodes is alternatingly stacked and held tightly together, the systems of bore holes form channels through which the fuel and oxidant, such as feed gases, may be forwarded and from which they may be introduced into the electrochemically active catalytic parts of the respective individual electrodes for the electrochemical reaction. The sides of the border 3 carrying the bore holes 4–7 are relatively wide so as to achieve sufficient strength and gasket area for this part of the electrode. Since the wire net 1 strengthens the electrode body FIG. 1 by taking up tensile forces in the direction of the plane of the electrode, those sides of the border 3 which do not have the bore holes may be made relatively narrow, as shown in FIG. 1.

The gasket borders 3 in cooperation with adjoining diaphragms provide effective seals when a series of the electrodes are assembled into a fuel cell battery, so that there is no loss of gas and liquids through the seams. The seal between the electrode and diaphragm members is particularly good if the edges of the diaphragms are correspondingly prepared and made hydrophobic.

Instead of using a wire net 1 for the construction of the just described electrode, one can use also a perforated metal foil or a sieve-like perforated thin sheet of metal or a foil of sintered metal particles. If one uses a sintered metal foil, the electrochemically active catalytic material 2 preferably fills the surface pores of the sintered foil. The foraminous web can be catalytically inert or catalytically active. In the latter case it can be of the same or different catalytic activity than the catalyst layer. Possibly, the web can be a catalytically active material, e.g. a sintered nickel-silver plate of foil having good porosity.

An electrical connection from one electrode to another readily can be made by joining a contact means 14 to the exposed wire net 1 at any convenient location, e.g. as shown in FIG. 1 and providing conductors from one electrode to the next one to which it is to be connected. Advantageously, the foraminous web 1 is made to project in one or more areas beyond the frame-like border of gasket material in the manner of a tab 8 or a contact strip, and electrical connections between individual electrodes can be made by conductively connecting the tabs in any desired manner or order. The tabs may be conductively connected with each other, outwardly of the border of gasket material, e.g. by soldering, welding or by the use of screws or of current conducting rails. The tabs projecting outwardly of the gasket border also are good conductors of heat energy, and their large surface areas exposed to the liquid or gaseous medium surrounding the cell or battery make them effective heat exchangers for the cooling of the cell or battery.

FIG. 2 illustrates the manner in which tabs 8 and $8^1$ projecting outwardly from the border of gasket material 3, are conductively connected to each other to form the electrical connections between the electrodes of a fuel cell battery. In FIG. 2, anodes 9 and cathodes 10 are alternatingly stacked face to face with porous diaphragms 11 interspersed therebetween. The tabs 8 of the anodes project to the left, tabs $8^1$ of the cathodes project to the right. The tabs 8 of the anodes 9 are conductively connected by current carrying rails 12 and the tabs $8^1$ of the cathodes 10 by rails 13. Effective cooling of the cells may be readily achieved by flowing a suitable cooling medium through the tabs 8 and $8^1$ in a direction perpendicularly to the planes of the electrodes.

The diaphragms 11 need not penetrate into the gasket material as shown, but need extend only partially therein with the plastic material 3 enclosing the ends of the diaphragms.

It is not always necessary that the foraminous web be a continuous structure. For example, it is advantageous to employ the web in the shape of a frame-like sintered metallic porous plate 16 having an outer exposed border of porous plate 16 and an inner exposed border 15 of porous plate 16 in FIG. 3. The inner portion of the web 1, i.e. that within the border 15, is covered with a layer of self-supporting electrochemically active catalytic material 2, e.g. in the form of a porous layer obtained by compressing and sintering a suitable finely particulate catalytic material onto the porous plate 16. This layer of compressed and sintered electrochemically active catalytic material 2 overlaps onto the inner edges of the border 15 and is thereby made integral with the porous plate 16 and is electrically conductive therewith. The porous plate 16 can be made of a less expensive metal, e.g., nickel, whereas the electrochemically active catalytic material 2 can be made of a more expensive composition such as nickel and silver or silver and palladium, for example. The plate 16 then helps to dissipate the heat energy as well as to serve as an electrical conductor. The inner exposed border 15 is surrounded by a frame-like border of gasket material 3 in a manner as described hereinbefore. Outwardly, beyond gasket border 3 projects, all around, a rectangular frame-like outer portion of the porous plate 16. Thus, in this embodiment of the electrode of the invention, the porous foil-like carrier, i.e., porous plate 16, is contained only in part of the layer of electrochemically active material, rather than extending across and being embedded in the whole layer of electrochemical material 2 as exemplified in FIGS. 1 and 2. The same principle of partial extension may be employed in a circular electrode, in which the foraminous web forms a ring-like flat structure with the electrochemically active catalytic material 2 forming a central circular layer surrounded by a circular gasket border.

When there is no foil-like porous and/or perforated carrier material 1 provided in the central areas of the electrode, as exemplified in FIG. 3, it is preferred to imbed between the layers of electrochemically active catalytic material an intermediate layer of coarser porosity than prevails in the layers of electrochemical active material 2, so as to provide a porous course for the passage of the gaseous fuel and other materials to the catalyst material 2.

In another embodiment of the electrode of the present invention, a foraminous web in the form of a circular screen 1 of metal carrier material is employed on which are deposited upper and lower ring-like layers of the electrochemically active catalytic material 2. This embodiment of the electrode is exemplified in FIG. 4. The circular screen 1, having a radius corresponding to that of the illustrated electrode, is provided with tab 8 to which a contact means can be attached. The ring-like layers 2 of catalytic material 2 are compressed into the screen 1 opposite each other on both sides of the screen. The layers 2 are surrounded at their circumference by upper and lower ring-like borders 3 of thin plastic. The inner openings of the ring-like layers of electrochemical material 2 are likewise bordered by upper and lower ring-like borders 3 of thin plastic. The thicknesses of the plastic borders 3 are approximately the same as that of the layers of electrochemically active catalytic material 2. The ring-like borders 3 leave a circular central area of exposed screen 1 free of plastic material 3 and of electrochemically active catalytic material 2. As before, the plastic material 3 forming opposite borders is joined, with the screen 1 imbedded, to form tight seals at the outer and inner edges of the rings of the electrochemically active catalytic material 2.

Figure 4:
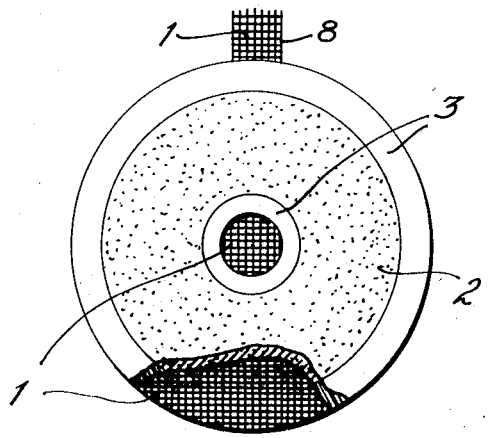
FIG. 4 is a side elevation of a circular electrode of the invention in schematic representation, which comprises a contact means and heat dissipating tab at the periphery and has a central portion of the foraminous web exposed, i.e., unoccupied by the catalytic material.

When finished electrodes according to FIG. 4 are stacked to form a battery, a central channel is formed by the open, porous circular areas of the screens 1. Diaphragms of porous material for such a battery are correspondingly designed and provided with similar central openings. The channel formed by the alternating layers of anodes, diaphragms and cathodes in the battery is advantageously used for the passage or circulation, respectively, of a cooling medium for the battery. As cooling medium either a gas, e.g., air, or a dielectric liquid, e.g., mineral oil, preferably the latter, can be used.

Figure 5:
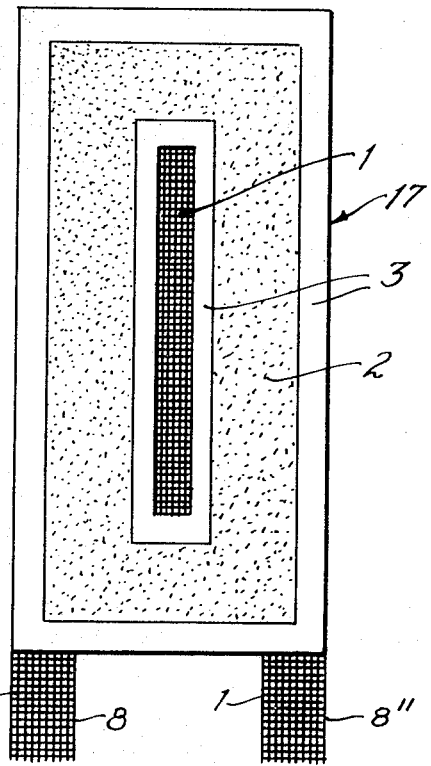
FIG. 5 is a side elevation of a rectangular electrode of the invention, having two tabs at one edge and a central portion of the foraminous web unoccupied by the catalytic material.

FIG. 5 illustrates an arrangement similar to that of FIG. 4 but incorporated in a rectangular electrode. A rectangular sheet-like carrier of metallic wire net 1 is provided with tabs 8 and $8^{11}$ on one of its ends. Rectangular layers of electrochemically active catalytic material 2 are deposited on both sides of the wire net 1 and form a rectangular central opening which is bordered at the inner opening by upper and lower frame-like layers of plastic gasket material 3, leaving a central rectangular area of the wire net 1 open, i.e., not covered either by plastic material 3 or electrochemically active catalytic material 2. The rectangular layers 2 of electrochemically active catalytic material are surrounded by an outer rectangular frame of plastic gasket material 17.

When a multiplicity of electrodes of the type of FIG. 5 is interspersed with correspondingly centrally open porous diaphragms and is united to form a battery, a central channel of rectangular cross section is formed which may be used in the manner described above in relation to FIG. 4 for the passage of a cooling medium. The inner and outer borders of plastic gasket material 3 seal the outer and inner edges of the electrochemically active catalytic material 2 layers as described hereinbefore.

The layers of electrochemically active material 2 may be applied to the foraminous web in a variety of different ways. In the preferred mode of operation, one employs a wire net, e.g. a woven nickel wire net, the surface of which has been prepared by etching. Preformed plates or discs of the electrochemically active catalytic material 2, having a rectangular or circular or other shape and having the desired dimensions, are then placed on both sides of the wire net in the desired location. The plates or discs of electrochemically active catalytic material 2 are then pressed into the perforations of the net 1, or of the perforated sieve-like sheet, if such is used, so that the interstices are filled out as much as possible by the electrochemically active material 2. The compressed structure is then sintered at a suitable elevated temperature. If desired, the compression may be effected at a suitable elevated temperature, so that the electrochemically active catalytic material 2 is compressed and pressed into the interstices of the carrier web 1 and sintered at the same time to form the finished electrochemically active layers securely united with the foraminous web.

The layer of electrochemically active catalytic material 2 may also be applied by running the foraminous web between rolls. Subsequent heating or hot pressing effects sintering of the electrochemically active material and unites it with the carrier.

The gasket border is advantageously made from a thermoplastic material, such as heat softening plastics, which may be applied to the desired border areas of the wire net or other perforated carrier sheet in liquid form or in form of precut sheets to the carrier sheet and joined thereto by pressing in a suitable mold at a suitable processing temperature for the plastic.

The gasket material can be any plastic material which is gas and liquid impermeable and which will be chemically, electrically, mechanically, and thermally stable under the conditions encountered in the operation of an electrochemical cell, particularly a fuel cell. The gasket border material must be suitable for use and inert in the presence of acidic or basic electrolyte solutions such as potassium hydroxide and sulfuric acid as used in fuel cells. Examples of such plastic materials are found in "Textbook of Polymer Science", Fred W. Billmeyer, Jr., Interscience Publishers, N.Y. (1962), pp. 502–505, and are incorporated herein by reference. Polyethylene, polypropylene, polymers made from fluorinated olefins and copolymers of ethylene, propylene, trifluorochloroethylene or tetrafluoroethylene with at least one other monomer, polyamides, polyvinyl chloride are especially used for the gasket material. Polytetrafluoroethylene, polyamides, polyethylene and polyvinyl chloride are preferred.

In another mode of operation the frame-like border of gasket material may also be produced from a casting resin, which is applied in the desired border areas while the sheet of the porous carrier, containing already the layers of electrochemically active material joined thereto, is contained in a suitable mold. After pouring the required amounts of the resin, the resin is solidified or hardened in suitable manner, e.g., by heat treating or the like. For this purpose an epoxy resin such as is used in the battery making art is preferably used. The material applied to the foraminous web, and into which the web is at least partially embedded, need not be catalytic at the time the manufacture of the electrode is performed, since that material can be made catalytic by known methods after manufacture of the electrode. Hence, the material in which the web is embedded need only be inchoately catalytic, i.e., catalytically activable. The term "catalytic" is therefore used with that meaning herein.

The electrodes of the invention can be used in fuel cells or in other electrochemical processes e.g. for the water electrolysis. When the electrodes are used in fuel cells and are stacked together, inlets and outlets for the gases used as fuels and as oxidants usually will need to be provided. The inlets and outlets readily can be provided in the plastic border material as disclosed, for example, in FIG. 1 at 4, 5, 6 and 7, by drilling or otherwise forming the inlets and outlets through the electrode body at the desired locations. The following non-limiting example is illustrative of the invention.

EXAMPLE

A wire net of nickel, having openings 35 $\mu$ wide and wires of a thickness of 50 $\mu$, is subjected to surface etching in hot aqueous 10 percent hydrochloric acid washed and dried. A circular sheet of 60 mm diameter is thereafter cut from the pretreated wire net, and inserted between the two halves of a two-part compression mold having an open bore of 40 mm. The circular sheet of wire net is held in the mold under tension by holding the two parts of the mold together by screws. A plunger of a press is then introduced into one of the parts of the mold to a position where it touches the wire net. Thereafter, 6 g particulate double-skeleton catalyst material of the composition described hereinafter are leveled into the other part of the mold and the second opposite plunger of the press is inserted into this part of the mold in contact with the level surface of the catalyst powder. Thereafter, the first plunger is removed and another 6 g of the particulate catalyst material is leveled into the first part of the mold and the first plunger is reinserted in contact with the level surface of the catalyst powder in the first part of the mold.

The mold and the catalyst material contained therein is then heated to 400° C. and the catalyst powder contained on both sides of the wire net is compressed under a pressure of 30 tons. The mold is then opened and the parts of the mold are separated by removing the screws, and the wire net having joined thereto the compressed layers of catalyst material is removed therefrom.

Thereafter, rings of polyethylene sheet material, having an inner diameter of 41 mm and an outer diameter of 50 mm and being 1.5 mm thick, are placed on both sides of the wire net around the central circular layers of compressed catalyst material. The structure is then placed between two steel plates which are heated to 180° C. By applying pressure the two polyethylene rings are welded to each other through the openings in the wire net and compressed to the thickness of the layers of the catalyst material. The two rings of polyethylene readily weld together in spite of their low heat conductivity, because the wire net located between them readily transmits to their inner surfaces the required heat. In this manner, the perfect sealing of the outer plastic frame against the inner layers of catalyst material is readily achieved.

An exposed border of wire net of about 5 mm in width extends around the border of polyethylene on the electrode body. A contact strip is silver soldered to a portion of the exposed border before assembling the electrode into a battery. The exposed border serves as a cooling fin in accordance with the invention.

Oxygen diffusion electrodes and hydrogen diffusion electrodes are made principally by the same procedure. They differ merely in the nature of the particulate double-skeleton catalyst material (DSK-material) used for their production.

The catalyst material used in the foregoing example for the manufacture of a hydrogen electrode consisted of a mixture of 2 parts by weight carbonyl nickel having a particle size of less than 7 $\mu$ and 1 part by weight of a Raney-nickel alloy which consisted of 50 percent by weight aluminum and 50 percent by weight of nickel and which had a particle size ranging from 35 to 50 $\mu$.

The catalyst material used for the manufacture of an oxygen electrode by the procedure of the foregoing example consisted of a mixture of 2.5 parts by weight carbonyl nickel having a particle size of less than 7 $\mu$ and 1 part by weight of a Raney-silver alloy containing 35 percent by weight aluminum and 65 percent by weight of silver and having a particle size of less than 35 $\mu$.

The electrodes produced in the above described manner, after having been provided with the gasket border of polyethylene, were then activated by boiling in a 6 N KOH solution, followed by washing in dilute KOH solution and thereafter in water. The activated electrodes were then drilled to provide them with boreholes as illustrated in FIG. 1 for the passage and introduction of the gaseous reactants through and into the electrodes. The contact means is then silver soldered to the metal border and provided with a conductor for connecting to a contact rail in the battery. Thereafter, electrode blocks are formed by uniting two hydrogen electrodes and two oxygen electrodes in the usual manner and electrically connecting them in parallel. Cooling air, provided by a fan, was blown over the exposed fins of the electrodes. The electrode block, operated with an electrolyte of potassium hydroxide, carried a load of 4 amperes at 0.7 volts and maintained an operating temperature of 30° C.

In the electrode of this invention, it is preferred that the catalytic material be essentially in direct metallic, and therefore electrical and heat conductive, contact with the foraminous web. Likewise, it is also preferred that the metallic catalyst particles are essentially all in similar direct contact with adjoining metallic particles. As a result of this direct contact, excellent heat conductance is achieved from the electrochemically operating areas of the electrode, where the heat energy is formed, to the heat exchanger areas of the electrode where the heat is dissipated, or removed.

The electrodes may be combined in any other desired manner to form a fuel cell battery with the heat dissipating advantages described herein. The layers of electrochemically active material may be produced from many other catalyst materials known to be useful in electrodes and particularly in gas-diffusion electrodes. It is to be noted that fuel cells and fuel cell batteries containing the electrodes of the present invention may also be operated with fuels other than with hydrogen gas and oxygen gas used as the gases in the foregoing example.

Fuel cell batteries into which the electrodes of the invention can be built in are known and are described, for instance, in "Fuel Cell Systems", Advances in Chemistry Series, 47, American Chemical Society 1965; "Fuel Cells", Vols. I and II, George J. Young, Reinhold Pub. Corp.; "Brennstoffelements", Vielstich, Verlag Chimie, 1965; "Cold Combustion, Fuel Cells", Justi and Winsel, Franz Steiner Publisher, 1962, which are incorporated herein by reference. Further catalytic materials suitable for use in the instant electrodes are disclosed in the following U.S. Pat. Nos.: 2,860,175, 2,699,458, 2,969,413, 2,901,523, 3,068,157, which are incorporated herein by reference.

I claim:

1. A gas-diffusion electrode comprising a heat-transferring foraminous plate, catalytic material supported by said plate, and a gasket having an outer perimeter, said gasket being secured to said plate framing said catalytic material, said foraminous plate including a perimetric foraminous border which is free of the catalytic material and extends outwardly beyond and around the perimeter of said gasket.

2. The electrode of claim 1 in which the plate is metallic and both of its surfaces are at least partially covered by the catalytic material.

3. The electrode of claim 1 in which the plate is metallic and the catalytic material at least partially fills the openings of the plate.

4. The electrode of claim 1 in which the free portion of the plate is large enough to transfer essentially all of the heat produced in the neighborhood of the electrode away therefrom.

5. The electrode of claim 1 in which the gasket is electrically insulating and gas and liquid impermeable.

6. The electrode of claim 1 in which the plate is of one of the following: a porous, sintered metal powder, a metal screen, or a sieve.

7. The electrode of claim 1 in which the catalyst which the plate supports is compressed thereto and the gasket is of about the same thickness as said catalyst layer.

8. The electrode of claim 1 in which a portion of the plate within the inner borders of the gasket is free of catalytic material.

9. A fuel cell battery comprising a multiplicity of the electrodes of claim 1 electrically connected and arranged alternatingly as anodes and cathodes.

10. A gas-diffusion electrode comprising a heat-transferring foraminous plate, a catalytic material supported by said plate, and a gasket having an outer border said gasket being secured to said plate framing said catalytic material, said foraminous plate having an outer portion free of catalytic material which extends outwardly beyond the outer border of said gasket and a further inner portion of the foraminous plate within the confines of the outer border which is free of said catalytic material and is surrounded by the plate carrying the catalytic material.

11. The electrode of claim 10 and a further electrically insulating gasket framing said further inner free portion of said plate.

12. A fuel cell battery having at least a pair of the electrodes defined in claim 10 in which electrodes the respective inner portions, which are free of catalytic material communicate with each other forming connecting channels for circulation of the cooling medium for the fuel cell battery.

* * * * *